United States Patent Office 2,912,424
Patented Nov. 10, 1959

2,912,424

POLYMERIZATION OF α-OLEFINS TO SOLID POLYMERS WITH CATALYTIC MIXTURES OF ALUMINUM METAL, A TITANIUM COMPOUND AND A TETRA SUBSTITUTED AMMONIUM SALT

George O. Cash, Jr., Kingsport, Tenn., assignor to Eastman Kodak Company, Rochester, N.Y., a corporation of New Jersey No Drawing. Application November 29, 1955
Serial No. 549,834

12 Claims. (Cl. 260—94.9)

This invention relates to a new and improved polymerization process and is particularly concerned with the use of novel catalysts for preparing high molecular weight solid poly-α-olefins of high density and crystallinity. More specifically, the invention is concerned with improved processes for polymerizing olefins such as ethylene, propylene, or mixtures thereof, to give polymers having densities much higher than those achieved by high pressure polymerization processes, without the necessity of employing the extremely high temperature and pressure conditions necessary heretofore.

The commercial polyethylene prepared by high pressure polymerization techniques, although useful for a variety of applications, has a relatively low softening temperature and is too flexible for many uses. This high pressure polyethylene is characterized by a relatively high degree of chain branching and a density which is considerable lower than the theoretical density. Usually, pressures in excess of 500 atmospheres and commonly of the order of 1000-1500 atmospheres are employed to effect the polymerization to solid polymer. Such pressures have been necessary even with the use of oxygenated catalysts such as the peroxides.

For many years, olefins have been polymerized to give low molecular weight liquid polymers. Some success has attended scattered efforts to form solid polymers at low pressures and temperatures using various catalytic materials, but the results thereby obtained by use of catalytic materials have been almost completely unpredictable. Thus, a minor change in the nature of the catalytic material often has meant the difference between obtaining a low molecular weight liquid polymer and a high molecular weight solid polymer. Furthermore, some of the catalysts which would result in formation of solid polymer, did so only at extremely high pressures and hence offered little advantage over the usual high pressure polymerization processes wherein flexible low density polymers were obtained.

This invention is concerned with and has for an object to provide improved processes whereby α-monoolefins are readily polymerized by catalytic means to give high molecular weight solid polymers of improved softening temperature, density, crystallinity and stiffness. A particular object of the invention is to provide an improved process for preparing a wide variety of poly-α-olefins at pressures ranging from atmospheric pressure up to relatively high pressures and at temperatures ranging from −60° C. to about 130° C. Another object of the invention is to provide an improved method for making polyethylene, polypropylene, or ethylene-propylene copolymers having such improved characteristics.

These and other objects which will be apparent from the description and claims which follow are attained by means of the process embodying the present invention wherein α-monoolefins, either singly or in admixture, are readily polymerized to high molecular weight solid polymers by effecting the polymerization in the presence of a catalytic mixture of aluminum metal, a titanium compound from the group consisting of titanium tetrachloride, titanium tetrabromide, and titanium tetraalkoxides wherein each alkoxide group contains 1-4 carbon atoms, and a tetra substituted ammonium compound of the formula

wherein each R is an alkyl group containing 1-12 carbon atoms, R′ is a member of the group consisting of cyclohexyl, phenyl and alkyl groups of 1-12 carbon atoms, and X is a halogen atom. The process embodying the invention depends upon the combination of all three of these materials in order to achieve catalytic activity. A mixture of aluminum with a tetra substituted ammonium halide does not form an active catalyst. Likewise, a mixture of tetra substituted ammonium halide and a titanium halide is ineffective as a catalyst for this process. In contrast to this, excellent results are obtained with the catalytic mixture at very low temperatures and pressures to give solid highly crystalline, high density olefin polymers. It is thus apparent that the polymerization of α-olefins to form the solid high density polymers depends upon rather specific catalyst combinations, and the reason why the specific mixtures defined herein work so effectively while other combinations do not is not readily understood. The halogen component of the tetra substituted ammonium halide can be any of the well known halogen compounds such as the chlorides, bromides or iodides. Particularly good results are obtained with the bromides, and these compounds are therefore preferred. Although the R′ substituent on the nitrogen atom can be phenyl or cyclohexyl with good results, for convenience the substituent groups all are desirably alkyl groups within the range from methyl to dodecyl. The inventive process is carried out in liquid phase in an inert organic liquid and preferably an inert liquid hydrocarbon vehicle. The process proceeds with excellent results over a temperature range from as low as −60° to as high as 130° C. Ordinarily, temperatures within the range of −20° C. to 80° C. are preferred for optimum results. The pressure can be varied as desired, with pressures as low as atmospheric pressure being completely operable and pressures of 100 p.s.i. or higher being desirably employed in some cases, pressures of as much as 20,000 p.s.i. or higher being desirably used in some instances. For most commercial operations, pressures of 50-700 p.s.i. are preferred and give optimum yields of desirable polymer. The liquid vehicle employed is desirably one which serves both as a liquid medium and a solvent for the solid polymerization products at the temperature of polymerization.

The invention is applicable for polymerizing any of the well known α-monoolefinic hydrocarbons and preferably those containing from 2 to 10 carbon atoms. In most cases, the invention is particularly applicable for polymerizing ethylene, propylene or mixtures thereof, although any of the monoolefins can be used or any mixtures of monoolefins depending upon the type of product desired. When ethylene is employed as the monomer, the polyethylene obtained has a softening point or fusion point greater than 130° C. which means that products prepared therefrom can be readily employed in contact with boiling water without deformation or other deleterious results. The polymers embodying this invention have molecular weights greater than 1000 and usually greater than 10,000. The achievement of extremely high molecular weights does not present a problem employing the catalytic process herein described, and molecular weights even greater than 1,000,000 can be readily attained. The high molecular weight, high density polyethylenes of this invention are insoluble in solvents at ordinary temperatures but are partially soluble in such solvents as xylene, toluene or tetralin at temperatures of about 100° C. With the exception of the compounds of extremely high molecular weight, the polyethylenes obtained according to this invention are soluble in tetralin at 145° C. These solubility characteristics make it possible to carry out the polymerization process under conditions wherein a polymer formed is soluble in the reaction medium during the polymerization and can be precipitated therefrom by lowering the temperature of the resulting mixture.

The polyethylenes of this invention are highly crystalline and usually exhibit crystallinity above 80% as shown by X-ray diagrams. Ordinarily, the crystallinities of the polyethylenes obtained by this process average close to 90%. In contrast to the high pressure polyethylene known heretofore, the number of methyl groups per hundred carbon atoms in the polyethylenes of this invention are of the order of 0.5 or lower. The densities are of the order of 0.945 or higher, with densities of the order of 0.96 or higher being obtained in many cases. The inherent viscosities as measured in tetralin at 145° C. may be varied from about 0.5 or lower to 5.0 or higher. Melt indices as measured by the standard ASTM method may be varied from about 0.01 to 100 or even higher.

Thus, polyethylene prepared by means of this invention and having a molecular weight in the range of 50,000 exhibits a density above 0.95, a softening temperature of at least 130° C., a tensile strength of 3000–5500 p.s.i. and a stiffness in flexure at 5% deflection (ASTM test D747-50) of at least 50,000 p.s.i.

The polyolefins prepared in accordance with the invention can be molded or extruded into flexible plates or films. The products can be extruded to the form of pipe or tubing of greater rigidity than the usual high pressure polyethylene or can be injection molded into a great variety of articles. The polymers can also be cold drawn into ribbons, bands, fibers or filaments of high elasticity and rigidity. Fibers of high strength can be spun from the molten polyethylene obtained according to this process. The polypropylene prepared in the same way also has a very high degree of crystallinity and a very high density, and the polymers of other $\alpha$-olefins have similarly improved properties. The process of the invention can also be employed to effect the copolymerization of ethylene with other polymerizable $\alpha$-monoolefins and particularly with propylene. Other monoolefins which are suitably employed either alone or in admixtures include such materials as n-butylene, isobutylene, 1-pentene, 1-decene, and similar $\alpha$-monoolefins. In some cases, it is desirable to prepare copolymers of the $\alpha$-monoolefins in order to modify the properties for particular uses such as in molding or extrusion applications. Thus, copolymers of 5–95% ethylene with 95–5% propylene are desirably prepared in many cases.

In the practice of the invention, the aluminum metal is employed in powdered form whereby it is readily dispersed in the polymerization mixture. The tetra substituted ammonium halides are well known in the art and can be prepared by any of the well known methods. The catalytic activity does not depend upon any particular method of preparation. Similarly, the titanium compound can be titanium tetrachloride, titanium tetrabromide, or a titanium tetra alkoxide wherein each alkoxide group contains 1–4 carbon atoms. Of these titanium compounds, titanium tetrachloride is preferred for optimum catalyst activity, although titanium tetrabromide and such compounds as titanium tetrabutoxide can be employed with excellent results.

The only limitation on the temperature at which the process can be effected is the decomposition temperature of the catalyst. The pressure employed is usually only sufficient to maintain the reaction mixture in liquid form during the polymerization. The catalyst mixtures except for the metal employed are readily soluble in the organic liquid vehicles commonly employed and hence the uniformity of reaction can be readily controlled. The exact nature of the catalytic action between those components of the catalytic mixture is not understood. The extreme activity of the catalytic mixture is shown by the fact that the polymerization proceeds readily at temperatures as low as $-60°$ C. and atmospheric pressure. The combination of catalysts results in polymerization to solid polymer in substantial yields in periods of from a few minutes to a few hours. The tetra substituted ammonium halides and the titanium compounds are readily soluble in the reaction vehicle whereas the finely divided aluminum powder is readily maintained in a homogeneous dispersion by agitation of the reaction mixture.

The polymerization embodying the invention can be carried out batchwise or in a continuous flowing stream process. The continuous processes are preferred for economic reasons, and particularly good results are obtained using a continuous process wherein a polymerization mixture of constant composition is continuously and progressively introduced into the polymerization zone, and the mixture resulting from the polymerization is continuously and progressively withdrawn from the polymerization zone in amounts correlated and equivalent to the rate of introduction, whereby polymers of extremely uniform molecular weight distribution over a relatively narrow range are obtained. Such uniform polymers possess distinct advantages since they do not contain the low molecular weight or high molecular weight fractions which are ordinarily found in polyolefins prepared by batch processes. The ethylene or other $\alpha$-monoolefin can be charged to the polymerization mixture either as a pure material or in admixture with other materials such as hydrogen and hydrocarbons such as methane, ethane or propane. Ordinarily, relatively pure monomers are employed unless copolymers are desired. When the charged mixture consists of two or more olefins, the product consists of a true copolymer of the monomers rather than a mixture of homopolymers.

Although temperatures ranging from $-60°$ C. to 150° C. can be employed as desired, the usual process adapted for commercial production is carried out at a temperature in the range of from 20° C. to 130° C. for best results. In the preparation of the uniform polymers by the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 50 to 700 p.s.i. obtained by pressuring the system with the monomer being polymerized. The amount of vehicle employed can be varied over rather wide limits with relation to the monomer and catalyst mixture. Best results are obtained using a concentration of catalyst of from about 0.1% to about 4% by weight in the vehicle. The concentration of the monomer in the vehicle will vary rather widely depending upon the reaction conditions and will usually range from about 2 to 50% by weight, or preferably from about 2 to about 10% by weight based on the weight of the vehicle. Concentrations of monomer in the vehicle of about 3–7% by weight are commonly employed. Higher concentrations of monomer ordinarily increase the rate of polymerization. Concentrations above 5–10% by weight are ordinarily less desirable because the polymer dissolved in the reaction medium results in a very viscous solution.

The ratio of the individual components of the catalyst mixture to each other can be varied rather widely. For example, the ratio of the ammonium salt to the aluminum powder can vary from 1 molecular equivalent of the ammonium salt per 4 equivalents of aluminum to a ratio of 4 equivalents of the ammonium salt for 1 equivalent of aluminum. In turn, the ratio of titanium compound to the aluminum powder can be varied from 1 equivalent of aluminum to 4 molecular equivalents titanium compound to a ratio of 4 equivalents of aluminum to 1 equivalent of titanium compound. These ratios represent the preferred range of operations, although effective catalysts can be obtained by operating somewhat outside this range of composition. For convenience, equimolecular equivalents of the three components of the catalyst system can be used with excellent results. The preferred concentration of catalyst is in the range of 0.1 to 4% by weight of the ammonium halide based on the weight of the liquid reaction vehicle, although lower or higher concentrations can be employed to produce the highly crystalline polymers desired. The polymerization time can be varied as desired and usually will be of the order of from 30 minutes to several hours in batch processes with polymerization times of 1–4 hours commonly being employed. When a continuous process is employed, the contact time in the polymerization zone can also be regulated as desired, and in some cases it is not necessary to employ reaction or contact times much beyond one-half to one hour since a cyclic system can be employed involving precipitation of the polymer and return of the vehicle and unused catalyst to the charging zone wherein the catalyst can be replenished and additional monomer introduced.

The organic vehicle employed can be an aliphatic alkane or cycloalkyl such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzene, chloronapththalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-pentane, n-octane, iso-octane, methyl cyclohexane, tetralin, decalin, and any of the other well known inert liquid hydrocarbons.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

The invention is illustrated by the following examples of certain preferred embodiments thereof, although it will be understood that the invention is not limited thereby unless otherwise specifically indicated.

*Example 1*

Into a pressure reactor were charged 100 parts by volume of heptane, 1 part by weight of aluminum powder, an equimolar amount of tetramethyl ammonium bromide, and an equimolar amount of titanium tetrachloride. The reactor was thoroughly dry, and the reactor and contents were flushed with nitrogen and attached to an ethylene source at 30 p.s.i. gauged pressure. The polymerization mixture was agitated at room temperature for 2 hours, after which the temperature was raised to 90° C. and held there for 5 hours. The resulting solid polymer was filtered off, washed with ethanol, then with water and then with a sodium hydroxide solution to destroy any excess aluminum which might have been left. The resulting solid was then washed three times with water. The yield of highly crystalline polyethylene amounted to 53 parts by weight, and the polymer had an inherent viscosity of 1.8. This solid polyethylene had an average crystallinity of about 90% and contained less than one-half percent of chain branching. The density of the product was of the order of 0.945, and the softening temperature was above 130° C. Because of its relative stiffness, the polymer had excellent utility in the preparation of molded articles and exhibited a tensile strength of 3000–5500 p.s.i. and a stiffness in flexure at 5% deflection of more than 50,000 p.s.i. The polymer molded readily and could be extruded to form sheets and films of excellent quality.

*Example 2*

Although the tetra substituted ammonium bromides as described in the preceding example are preferred for optimum results, other halides can be employed. Thus, a pressure reactor containing 100 parts by volume of heptane, 1 part by weight of aluminum powder, an equimolar concentration of tetramethyl ammonium chloride, and an equimolar concentration of titanium tetrachloride was pressured with ethylene to 30 p.s.i. The resulting polymerization mixture was polymerized with agitation as described in the preceding example to give 27 parts by weight of highly crystalline, high molecular weight polyethylene.

*Example 3*

Similar results are obtained using tetramethyl ammonium iodide as one component of the catalyst mixture. When the process of Example 1 was followed, using tetramethyl ammonium iodide, a 22 part by weight yield of high molecular weight, highly crystalline polyethylene was obtained.

*Example 4*

Although the tetraalkyl ammonium halides are often employed for convenience, one of the substituent groups can be cyclohexyl or phenyl if desired. Furthermore, the ratio of the catalyst components can also be varied. Thus, a mixture of heptane containing about 5% by weight of ethylene, about 2% by weight of cyclohexyl triethyl ammonium bromide based on the weight of the heptane, aluminum powder amounting to about one-fourth of the molar equivalents of the ammonium halide, and titanium tetrachloride in an equimolar amount to the ammonium halide was polymerized under 30 p.s.i. ethylene pressure. The polymerization was effected by holding the mixture for 2 hours at room temperature under agitation and then raising the temperature to 90° C. for 5 hours. In this process, a good yield of high molecular weight, highly crystalline polyethylene was obtained.

*Example 5*

Ethylene was polymerized in heptane solution using a catalyst mixture consisting of phenyl trimethyl ammonium bromide, aluminum powder, and titanium tetrachloride wherein the ammonium halide and the titanium tetrachloride were employed in equimolar amounts and the ammonium bromide amounted to 2 molecular equivalents for each equivalent of aluminum. Under the conditions of Example 1, a high yield of highly crystalline, high molecular weight polyethylene as described was obtained.

*Example 6*

When a tetraalkyl ammonium halide is employed, the alkyl groups can be the same or different groups containing 1–12 carbon atoms. Thus polyethylene was produced in good yield in solid highly crystalline form using a catalytic mixture of dodecyl trimethyl ammonium bromide, an equivalent amount of aluminum powder, and 4 molecular equivalents of titanium tetrabromide per equivalent of the ammonium salt.

*Example 7*

Ethylene was polymerized to solid, high molecular weight, highly crystalline polymer in heptane solution using equimolar equivalents of tetramethyl ammonium bromide, aluminum powder, and titanium tetrabutoxide. The reaction conditions employed were 150 p.s.i. ethylene pressure and a reaction temperature of 130° C.

*Example 8*

Although the liquid alkanes are desirably employed in the polymerization, any of the inert organic liquid vehicles as described can be employed. Thus, toluene was employed as the reaction vehicle in the process of Example 1 to give a good yield of highly crystalline polyethylene having an inherent viscosity of 1.5 and a slightly lower molecular weight than the polymer produced according to Example 1. When the same procedure was followed using chlorobenzene as the solvent, a still lower molecular weight solid polyethylene was obtained, the inherent viscosity being approximately 1.2.

*Example 9*

The molecular weight of the polymer can be varied rather widely by changing the reaction conditions such as the reaction temperature, reaction time, concentration and nature of the catalyst mixture and solvent. Thus, ethylene was polymerized in heptane vehicle using a 4% concentration based on the vehicle weight of tetramethyl ammonium bromide together with equivalent quantities of aluminum powder and titanium tetrachloride. The polymerization was effected at room temperature under 150 p.s.i. ethylene pressure for a reaction time of 48 hours. High molecular weight polyethylene having a high degree of crystallinity was obtained in a yield of 15 parts by weight. The polymer had an inherent viscosity of approximately 2.5.

*Example 10*

Although the invention is particularly valuable in permitting the production of polyolefins at relatively low temperatures and pressures, higher temperatures and pressures can be employed if desired. Thus, a mixture of heptane, 1% by weight of tetramethyl ammonium bromide, and equivalent amounts of aluminum powder and titanium tetrachloride were charged into a dry autoclave which was flushed with dry nitrogen. The reaction was carried out at 150° C. under 20,000 p.s.i. gauged pressure of ethylene. Under these conditions, a good yield of high molecular weight, highly crystalline polyethylene was obtained in a two-hour reaction period.

*Example 11*

The invention is of particular utility in the preparation of polyethylene, but any of the other α-monoolefins can be polymerized in similar fashion. Thus, the procedure of Example 1 was employed to prepare solid polymers of propylene, 1-butene, 1-pentane, 1-hexene, and 1-decene in good yields. The various procedures described were also effective for forming copolymers of ethylene and propylene in all proportions. The copolymers had a wide range of properties varying from copolymers resembling the high molecular weight, highly crystalline polyethylene at low concentrations of propylene up to rather rubbery copolymers when the concentration of propylene exceeded about 20% and particularly above 50%. The copolymers showed unusually good molding characteristics.

Similar results are obtained with other polymerization mixtures as described herein. The polymers thus obtained can be extruded, mechanically milled, cast or molded as desired. The polymers are sometimes particularly valuable as blending agents with the relatively more flexible high pressure polyethylenes to give any desired combination of properties. The polymers can also be blended with antioxidants, stabilizers, plasticizers, fillers, pigments and the like or mixed with other polymeric materials, waxes and the like. In general, aside from the relatively higher values for properties such as softening point, density, stiffness and the like, the polymers embodying this invention can be treated in similar manner to those obtained by other processes.

Although the invention has been described in considerable detail with reference to certain preferred embodiments thereof, variations and modifications can be effected within the spirit and scope of the invention as described hereinabove and as defined in the appended claims.

I claim:

1. In the polymerization of aliphatic α-monoolefinic hydrocarbon material containing 2–10 carbon atoms to form solid polymer, the improvement which comprises catalyzing the polymerization at a temperature of from −60° to 150° C. and a pressure of 50–20,000 p.s.i. with a mixture of aluminum metal, a titanium compound from the group consisting of titanium tetrachloride, titanium tetrabromide, and titanium tetraalkoxides wherein each alkoxide group contains 1–4 carbon atoms, and a halogen-containing compound of the formula

wherein each R is an alkyl group containing 1–12 carbon atoms, R' is a member of the group consisting of cyclohexyl, phenyl, and alkyl groups of 1–12 carbon atoms, and X is a halogen atom, the molar ratio of said halogen-containing compound to said aluminum metal being in the range of from 1:4 to 4:1 and the molar ratio of said aluminum metal to said titanium compound being in the range of from 1:2 to 4:1.

2. In the polymerization of α-monoolefinic hydrocarbon material to form solid polymer, the improvement which comprises polymerizing at least one α-monoolefin from the group consisting of ethylene and propylene in an inert organic liquid at a temperature of 20–130° C. and a pressure of 50–700 p.s.i. in the presence of a catalytic mixture of aluminum metal, tetraalkyl ammonium monohalide, wherein each alkyl group contains 1–12 carbon atoms, and titanium tetrachloride, the molar ratio of said ammonium compound to said aluminum metal being in the range of from 1:4 to 4:1 and the molar ratio of said aluminum metal to said titanium compound being in the range of from 1:2 to 4:1.

3. In the polymerization of α-monoolefinic hydrocarbon material to form solid polymer, the improvement which comprises polymerizing at least one α-monoolefin from the group consisting of ethylene and propylene in an inert organic liquid at a temperature of 20–130° C. and a pressure of 50–700 p.s.i. in the presence of a catalytic mixture of aluminum metal, tetraalkyl ammonium monohalide, wherein each alkyl group contains 1–12 carbon atoms, and titanium tetrabromide, the molar ratio of said ammonium compound to said aluminum metal being in the range of from 1:4 to 4:1 and the molar ratio of said aluminum metal to said titanium compound being in the range of from 1:2 to 4:1.

4. In the polymerization of α-monoolefinic hydrocarbon material to form solid polymer, the improvement which comprises polymerizing at least one α-monoolefin from the group consisting of ethylene and propylene in an inert organic liquid at a temperature of 20–130° C. and a pressure of 50–700 p.s.i. in the presence of a catalytic mixture of aluminum metal, tetraalkyl ammonium monohalide, wherein each alkyl group contains 1–12 carbon atoms, and titanium tetrabutoxide, the molar ratio of said ammonium compound to said aluminum metal being in the range of from 1:4 to 4:1 and the molar ratio of said aluminum metal to said titanium compound being in the range of from 1:2 to 4:1.

5. In the polymerization of ethylene to form solid polymer, the improvement which comprises effecting the polymerization at a temperature of 20–130° C. and a pressure of 50–700 p.s.i. in an inert hydrocarbon liquid vehicle with a catalytic mixture of tetramethyl ammonium bromide, aluminum metal, and titanium tetrachloride, the molar ratio of said ammonium compound to said aluminum metal being in the range of from 1:4 to 4:1 and the molar ratio of said aluminum metal to said titanium compound being in the range of from 1:2 to 4:1.

6. In the polymerization of ethylene to form solid polymer, the improvement which comprises effecting the polymerization at a temperature of 20–130° C. and a pressume of 50–700 p.s.i. in an inert hydrocarbon liquid vehicle with a catalytic mixture of tetramethyl ammonium bromide, aluminum metal, and titanium tetrabromide, the molar ratio of said ammonium compound to said aluminum metal being in the range of from 1:4 to 4:1 and the molar ratio of said aluminum metal to said titanium compound being in the range of from 1:2 to 4:1.

7. In the polymerization of ethylene to form solid polymer, the improvement which comprises effecting the polymerization at a temperature of 20–130° C. and a pressure of 50–700 p.s.i. in an inert hydrocarbon liquid vehicle with a catalytic mixture of tetramethyl ammonium bromide, aluminum metal, and titanium tetrabutoxide, the molar ratio of said ammonium compound to said aluminum metal being in the range of from 1:4 to 4:1 and the molar ratio of said aluminum metal to said titanium compound being in the range of from 1:2 to 4:1.

8. The process for forming solid polymer which comprises progressively introducing into a polymerization zone a polymerization mixture of substantially constant composition comprising an inert organic liquid vehicle, aliphatic α-monoolefinic hydrocarbon material containing 2–10 carbon atoms in a concentration soluble in said vehicle, and a catalytic mixture of aluminum metal, a titanium compound from the group consisting of titanium tetrachloride, titanium tetrabromide and titanium tetraalkoxides wherein each alkoxide group contains 1–4 carbon atoms, and an ammonium compound of the formula

wherein each R is an alkyl group containing 1–12 carbon atoms, R' is a member of the group consisting of cyclohexyl, phenyl, and alkyl groups of 1–12 carbon atoms, and X is a halogen atom, maintaining said polymerization mixture in said zone in liquid dispersion at a pressure of 50–20,000 p.s.i. and temperature of from —60 to 130° C. for a time sufficient for formation of solid polymer, and progressively withdrawing the resulting mixture from said zone in amounts correlated to the introduction of polymerization mixture into said zone whereby the relative proportions of the components in said zone remain substantially unchanged during said process, the molar ratio of said ammonium compound to said aluminum metal being in the range of from 1:4 to 4:1 and the molar ratio of said aluminum metal to said titanium compound being in the range of from 1:2 to 4:1.

9. The process for forming solid polymer which comprises progressively and continuously introducing into a polymerization zone at a substantially constant rate a polymerization mixture of substantially constant composition comprising an inert liquid hydrocarbon vehicle, at least one monoolefin from the group consisting of ethylene and propylene in a concentration soluble in said vehicle, and a catalytic mixture of aluminum metal, tetraalkyl ammonium halide wherein each alkyl group contains 1–12 carbon atoms, and a titanium compound from the group consisting of titanium tetrachloride, titanium tetrabromide and titanium teraalkoxides wherein each alkoxide group contains 1–4 carbon atoms, the molar ratio of said tetraalkyl ammonium halide to said aluminum metal being in the range of from 1:4 to 4:1 and the molar ratio of the aluminum metal to the titanium compound being in the range of from 1:2 to 4:1, maintaining said polymerization mixture in said zone in liquid dispersion and at a pressure of 50–700 p.s.i. and a substantially constant temperature in the range of —20° C. to 80° C. for a time sufficient for substantial formation of solid polymer, and progressively and continuously withdrawing the resulting mixture from said polymerization zone at a substantially constant rate equivalent to the rate of introduction of said polymerization mixture into said zone whereby the relative proportions of the various components in said zone remains substantially unchanged during said process.

10. The process for forming solid polymer which comprises progressively and continuously introducing into a polymerization zone at a substantially constant rate a polymerization mixture of substantially constant composition comprising an inert liquid hydrocarbon vehicle, at least one monoolefin from the group consisting of ethylene and propylene in a concentration soluble in said vehicle, and a catalytic mixture of aluminum metal, tetramethyl ammonium bromide and titanium tetrachloride, the molar ratio of said tetramethyl ammonium bromide to said aluminum metal being in the range of from 1:4 to 4:1 and the molar ratio of said aluminum metal to said titanium tetrachloride being in the range of from 1:2 to 4:1, maintaining said polymerization mixture in said zone in liquid dispersion and at a pressure of 50–700 p.s.i. and a substantially constant temperature in the range of —20° C. to 80° C. for a time sufficient for substantial formation of solid polymer, and progressively and continuously withdrawing the resulting mixture from said zone at a substantially constant rate equivalent to said rate of introduction whereby the relative proportions of the various components in said zone remains substantially unchanged during said process.

11. The process for forming solid polymer which comprises progressively and continuously introducing into a polymerization zone at a substantially constant rate a polymerization mixture of substantially constant composition comprising an inert liquid hydrocarbon vehicle, at least one monoolefin from the group consisting of ethylene and propylene in a concentration soluble in said vehicle, and a catalytic mixture of aluminum metal, tetramethyl ammonium bromide and titanium tetrabromide, the molar ratio of said tetramethyl ammonium bromide to said aluminum metal being in the range of from 1:4 to 4:1 and the molar ratio of said aluminum metal to said titanium tetrabromide being in the range of from 1:2 to 4:1, maintaining said polymerization mixture in said zone in liquid dispersion and at a pressure of 50–700 p.s.i. and a substantially constant temperature in the range of —20° C. to 80° C. for a time sufficient for substantial formation of solid polymer, and progressively and continuously withdrawing the resulting mixture from said zone at a substantially constant rate equivalent to said rate of introduction whereby the relative proportions of the various components in said zone remains substantially unchanged during said process.

12. The process for forming solid polymer which comprises progressively and continuously introducing into a polymerization zone at a substantially constant rate a polymerization mixture of substantially constant composition comprising an inert liquid hydrocarbon vehicle, at least one monoolefin from the group consisting of ethylene and propylene in a concentration soluble in said vehicle, and a catalytic mixture of aluminum metal, tetramethyl ammonium bromide and titanium tetrabutoxide, the molar ratio of said tetramethyl ammonium bromide to said aluminum metal being in the range of from 1:4 to 4:1 and the molar ratio of said aluminum metal to said titanium tetrabutoxide being in the range of from 1:2 to 4:1, maintaining said polymerization mixture in said zone in liquid dispersion and at a pressure of 50–700 p.s.i. and a substantially constant temperature in the range of −20° C. to 80° C. for a time sufficient for substantial formation of solid polymer, and progressively and continuously withdrawing the resulting mixture from said zone at a substantially constant rate equivalent to said rate of introduction whereby the relative proportions of the various components in said zone remains substantially unchanged during said process.

References Cited in the file of this patent

UNITED STATES PATENTS

| | | |
|---|---|---|
| 2,721,189 | Anderson | Oct. 18, 1955 |
| 2,846,427 | Findlay | Aug. 5, 1958 |

FOREIGN PATENTS

| | | |
|---|---|---|
| 874,215 | Germany | Apr. 20, 1953 |
| 534,792 | Belgium | Jan. 31, 1955 |

OTHER REFERENCES

Mellor: Modern Inorganic Chemistry, page 655, published 1939, Longmans, Green & Co., New York, N. Y.